(12) United States Patent
Davis et al.

(10) Patent No.: US 10,186,087 B2
(45) Date of Patent: Jan. 22, 2019

(54) OCCLUDING AUGMENTED REALITY OBJECTS

(71) Applicant: AURASMA LIMITED, Berkshire (GB)

(72) Inventors: Stephen Davis, Cambridge (GB); George Saklatvala, Cambridge (GB)

(73) Assignee: Hewlett-Packard Development Company, L. P., Houston, TX (US)

( * ) Notice: Subject to any disclaimer, the term of this patent is extended or adjusted under 35 U.S.C. 154(b) by 0 days.

(21) Appl. No.: 15/102,159

(22) PCT Filed: Dec. 6, 2013

(86) PCT No.: PCT/EP2013/075798
§ 371 (c)(1),
(2) Date: Jun. 6, 2016

(87) PCT Pub. No.: WO2015/082015
PCT Pub. Date: Jun. 11, 2015

(65) Prior Publication Data
US 2016/0314622 A1  Oct. 27, 2016

(51) Int. Cl.
*G06T 19/00* (2011.01)
*G06T 7/70* (2017.01)
(Continued)

(52) U.S. Cl.
CPC .............. *G06T 19/006* (2013.01); *G06T 7/10* (2017.01); *G06T 7/194* (2017.01); *G06T 7/70* (2017.01);
(Continued)

(58) Field of Classification Search
None
See application file for complete search history.

(56) References Cited

U.S. PATENT DOCUMENTS

2010/0046830 A1* 2/2010 Wang ........................ G06T 7/12
382/164
2011/0285910 A1* 11/2011 Bamji ..................... G01S 17/89
348/631
(Continued)

FOREIGN PATENT DOCUMENTS

CN  101853505  10/2010
CN  102509343  6/2012

OTHER PUBLICATIONS

Duff et al., "Compositing Digital Images," ACM 1984.*
(Continued)

*Primary Examiner* — Nicholas R Wilson
(74) *Attorney, Agent, or Firm* — HP Inc. Patent Department

(57) ABSTRACT

Techniques for occluding augmented reality objects are described in various implementations. In one example implementation, a method may include receiving an image captured by an image capture device and identifying a foreground object depicted in the image. The foreground object may be free of fiducial markers and may be positioned between the image capture device and a background depicted in the image. The method may also include generating an augmented reality image depicting an augmented reality object at least partially occluded by the foreground object such that, when the augmented reality image is displayed, the augmented reality object appears to be positioned behind the foreground object.

15 Claims, 3 Drawing Sheets

(51) Int. Cl.
*G06T 7/10* (2017.01)
*G06T 7/194* (2017.01)

(52) U.S. Cl.
CPC ............... *G06T 2207/30204* (2013.01); *G06T 2210/62* (2013.01); *G06T 2215/16* (2013.01)

(56) References Cited

U.S. PATENT DOCUMENTS

| | | | | | |
|---|---|---|---|---|---|
| 2012/0105473 | A1* | 5/2012 | Bar-Zeev | ................... | G06T 7/70 345/633 |
| 2012/0176410 | A1* | 7/2012 | Meier | ..................... | G06F 3/011 345/633 |
| 2012/0314942 | A1* | 12/2012 | Williams | .............. | G06T 19/006 382/164 |
| 2014/0085446 | A1* | 3/2014 | Hicks | ................... | G09B 21/008 348/62 |

OTHER PUBLICATIONS

Birgi Tamersoy, "Background Subtraction," Sep. 29th, 2009, http://www.cs.utexas.edu/~grauman/courses/fall2009/slides/lecture9_background.pdf.*

Lee, T. et al.; "Handy AR: Markerless Inspection of Augmented Reality Objects Using Fingertip Tracking"; Jul. 22, 2007; 8 pages.
Lepetit, V. et al.: "Handling occlusion in augmented reality systems: a semi-automatic method", Augmented Reality, 2000. (ISAR 2000). Proceedings. IEEE and ACM International Symposium on Munich, Germany Oct. 5-6, 2000, Piscataway, NJ, USA, IEEE, US, Oct. 5, 2000, pp. 137-146, XP010520323.
Mendez, E. et al.; "Importance Masks for Revealing Occluded Objects in Augmented Reality"; Aug. 26, 2009; 2 pages.
Strange, A.; "AR Glasses Let You Control Virtual Objects with Your Fingertips"; Jan. 28, 2013; 4 pages.
Buchmann, et al.: "Interaction with Partially Transparent Hands and Objects", Auic '05 Proceedings of the sixth Australasian Conference on User Interface vol. 40, 2005, pp. 17-20, XP055139817.
Wloka, et al.: "Resolving Occlusion in Augmented Reality" Proceeding of Symposium on Interactive 3D graphics. Monterey, Apr. 9-12, 1995: [Proceedings of the Symposium on Interactive 3D Graphics], New York, ACM, US, Apr. 9, 1995, pp. 5-12 XP000546182.
Tian, Yuan, et al.: "Real-Time Occlusion Handling in Augmented Reality Based on Object Tracking Approach". Sensors, Molecular Diversity Preservation International (MDPI), CH, vol. 10, No. 4 Mar. 29, 2010, pp. 2885-2990, XP002685272.

* cited by examiner

OCCLUDING AUGMENTED REALITY OBJECTS

CROSS-REFERENCE TO RELATED APPLICATION

This application is a U.S. National Stage Application of and claims priority to International Patent Application No. PCT/EP2013/075798, filed on Dec. 6, 2013, and entitled "OCCLUDING AUGMENTED REALITY OBJECTS," which is hereby incorporated by reference in its entirety.

BACKGROUND

Augmented reality refers to a technology platform that merges the physical and virtual worlds by augmenting scenes depicting real-world physical objects with virtual objects. For example, a real-world physical newspaper may be out of date the moment it is printed, but an augmented reality system may be used to recognize an article in the newspaper as a trigger that initiates an augmented reality scenario, which may provide, e.g., a video with up-to-date virtual content related to the article. While the newspaper generally represents a static text and image-based communication medium, the virtual content need not be limited to the same medium. Indeed, in some augmented reality scenarios, the newspaper article may be augmented with audio and/or video-based content (e.g., a video overlay) that provides the user with additional or more meaningful information.

Some augmented reality systems operate on mobile devices, such as smartphones or tablets. In such systems, the mobile device may display its camera feed (e.g., on a touchscreen or other display of the device) augmented by virtual objects that are superimposed in the camera feed. In the newspaper example above, a user may point the mobile device camera at the article in the newspaper, and the mobile device may show the camera feed (i.e., the current view of the camera, which includes the real-world article) augmented with a video or other virtual content, e.g., in place of or overlaying a static image in the article. This creates the illusion of additional or different objects than are actually present in reality.

DETAILED DESCRIPTION

Figure 1A:
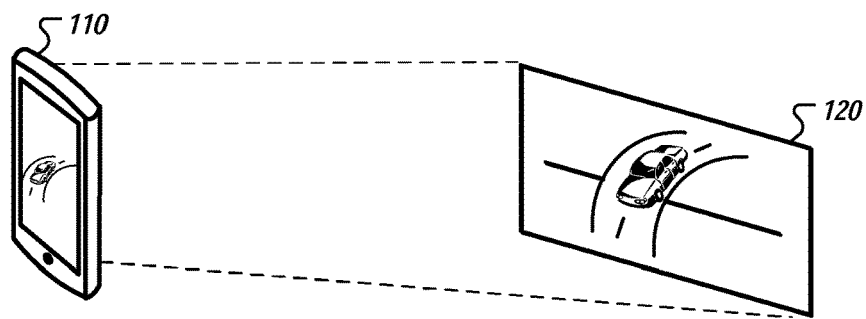
FIGS. 1A-1C are conceptual diagrams showing examples of an augmented reality environment.

Some augmented reality systems provide users with a certain level of interactivity or control. For example, an augmented reality scenario may display a virtual "purchase" button or another interactive virtual object (e.g., a button, slider, dial, etc.) that allows the user to control the scenario in some manner. In some interactive systems, users may be allowed to interact with virtual objects directly in the virtual environment, e.g., by gesturing with a hand or another physical object in front of the camera to control or manipulate the virtual objects being presented in the augmented reality scenario. The augmented reality system may then change the appearance of the virtual objects as the user interacts with them, giving the impression that the virtual objects are being influenced directly by the user—similarly to how real-world objects are influenced directly by a user.

In cases where the behavior of the virtual objects resembles that of similar real-world objects, the way in which the virtual objects are intended to be used may be readily apparent to the user, e.g., without providing any additional instruction to the user. For example, an augmented reality button could be activated by the user "pushing" the virtual button with a finger much like a real-world button would be activated. In another example, an augmented reality volume dial could be "turned up" by the user's hand grasping and turning the dial clockwise. These and other interfaces may be intuitive to a wide population of users.

In these and other augmented reality systems, virtual objects are typically superimposed on top of the video feed from the camera such that the virtual objects obscure from view some of the real-world objects contained in the video feed. In the example of a newspaper article triggering an augmented reality scenario, the augmentation may be displayed as if appearing on top of, in front of, or otherwise obscuring a portion of the real-world newspaper. Such obscuring of the real-world objects by the virtual objects may reduce the illusion of augmented reality in some cases, especially where the real-world objects are positioned closer to the camera than the virtual objects are intended to appear. Furthermore, obscuring real-world foreground objects (e.g., a user's hand that is gesturing just in front of the camera) may also make it more difficult for the user to interact with the virtual objects in the augmented reality scenario. As used herein, the term "foreground object" is used to describe a real-world object that is positioned closer to the camera than other real-world objects in the "background" of the camera feed, and that is intended to be perceived as being closer to the camera than virtual objects being depicted in the augmented reality scene.

Techniques are described herein to display virtual objects more realistically in an augmented reality scenario by occluding virtual objects with real-world foreground objects identified in the camera feed. For example, if a real-world object (e.g., a user's hand or other appropriate object) is determined to be positioned between the camera and where the virtual object is supposed to be located (i.e., the foreground object is intended to be positioned in front of the virtual object), the foreground object may be displayed as occluding the augmentation in the augmented reality scene rather than the augmentation occluding the foreground object. Such visual layering of certain real-world objects on top of virtual objects may provide a more realistic user interface and may enhance the user experience.

The techniques described herein may, in some implementations, be performed using a two-dimensional camera, such as a standard camera found on most mobile devices, and the foreground objects need not be a specific shape or color or include any distinctive markings, such as fiducial markers. Furthermore, the camera does not need to be held in a fixed position, and so the techniques are amenable to real-world mobile device usage scenarios, such as where a user is holding the mobile device in one hand while gesturing in the virtual environment space (e.g., pointing to a virtual object that appears to be in front of the camera) with the other hand.

Figure 1B:
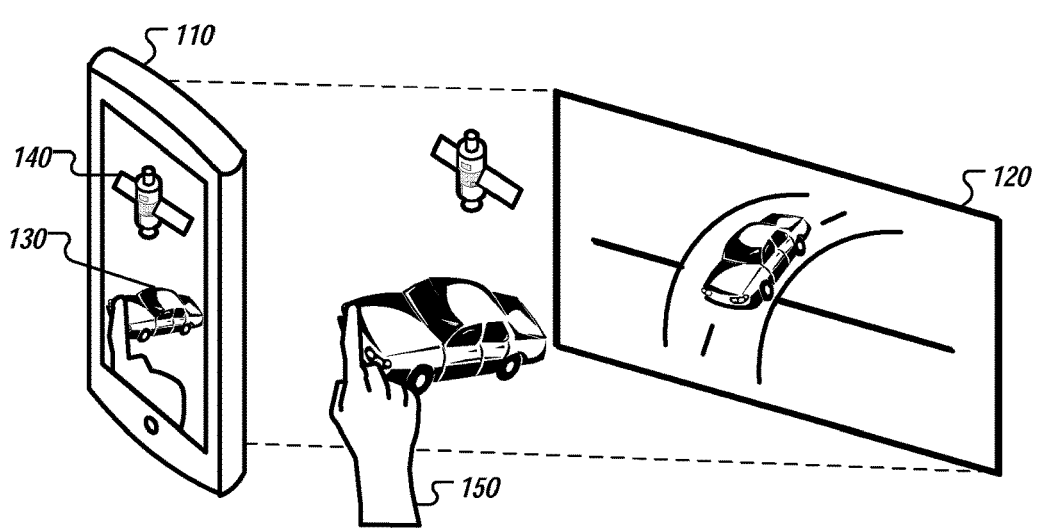
Figure 1C:
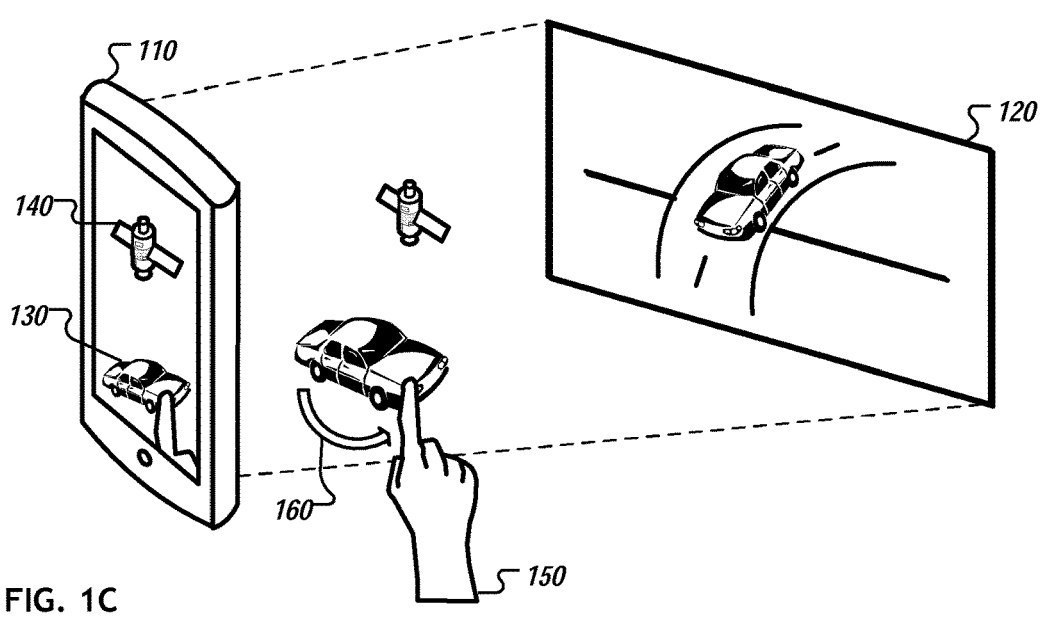

FIGS. 1A-1C are conceptual diagrams showing examples of an augmented reality environment. The augmented reality environment is shown at three sequential points in time. At all three points in time, the environment includes a mobile device 110 and a background image 120 that depicts a car driving on a road. The mobile device 110 and the background image 120 represent real-world physical objects. While the sequence of events shown in FIGS. 1A-1C is illustrative of a particular implementation of the techniques described herein from a user's perspective, it should be understood that other sequences, events, or types of events are also within the scope of this disclosure. Also, while the background image 120 is shown as a two-dimensional poster, it should be understood that other backgrounds, including three-dimensional spaces and/or objects, may also serve as backgrounds in certain implementations.

FIG. 1A shows an example initialization phase, during which the mobile device 110 is pointed at the background image 120. In particular the camera of the mobile device 110 may be pointed in a manner that captures at least a portion of the background image 120 in its field of view, and the field of view may be free of any foreground objects positioned between the mobile device 110 and the background image 120. The captured portion of the background image 120 may be linked to and/or otherwise provide a trigger to initiate an augmented reality scenario, or the background image 120 may simply be in a location that is visible to the mobile device 110 when an augmented reality scenario is triggered. In the initialization phase, the background image 120 and any other objects within the field of view of the camera may be captured and stored as an initialization image, which may depict a background that is free of any foreground objects positioned between the background and the camera. The initialization image may then be used to identify foreground objects positioned between the background and the camera in subsequent images, e.g., by comparing the initialization image to the subsequent images to identify objects that were not present during initialization.

In FIG. 1B, the background image 120 has been brought to life using augmented reality. In particular, the view of the background image 120 in the camera feed has been augmented to include two virtual objects 130 and 140, which are superimposed in the camera feed such that it appears (e.g., as displayed on the screen of mobile device 110) that the objects are positioned between the mobile device 110 and the background image 120. In some cases, the virtual objects may be rendered using three-dimensional graphical techniques, e.g., such that they appear to the user to be moving off the background image and towards the user.

As shown in FIG. 1B, the user (or someone else) has placed a foreground object 150 in between the mobile device 110 and the background image 120. In this case, the foreground object 150 is depicted as the user's hand, but it should be understood that other appropriate foreground objects (e.g., a stylus, a wand, or another physical object) may also or alternatively be used in accordance with the techniques described here. The foreground object 150 may, in some implementations, be any shape or color, and need not include any type of distinctive markings, such as fiducial markers.

In FIG. 1B, the foreground object 150 has been identified as a foreground object (as opposed to being part of the background), and as such is displayed on the screen of the mobile device 110 as appearing nearer to the device than the virtual objects 130 and 140. In the example shown, the foreground object 150 occludes a portion of the "car" virtual object 130, giving the appearance that the foreground object 150 is positioned in front of the virtual object 130, which may provide a more realistic augmentation than if the "car" virtual object 130 instead occluded the foreground object 150. In this example, the foreground object 150 may be identified as a foreground object based on a comparison of the current image with an initialization image, but other markerless identification techniques may also or alternatively be utilized, as described below.

In the example, the foreground object 150 may also be used to "grab" the front right corner of the "car" virtual object in FIG. 1B. Then, as shown in FIG. 1C, the foreground object 150 may gesture in a motion shown by arrow 160 to swing the virtual object 130 around in space as is shown to the user on device 110. Thus, the virtual object 130 may be manipulated using a simple and intuitive gesture that occurs within the augmented reality environment space (e.g., using a foreground object 150 positioned in between the camera of mobile device 110 and the background image 120) where the virtual objects appear to be located. Since the foreground object 150 is displayed in front of the virtual object 130, the user may have a continuous visual reference of where the foreground object 150 is in relation to the augmented reality scene, thus providing improved realism and/or control during the interaction.

In some implementations, the position of the camera in the mobile device 110 need not remain fixed with respect to the background image 120. Indeed, the mobile device 110 may be rotated or translated in space along any axis or along multiple axes. As such, the device may be tilted, or may be moved nearer to or farther from the background image 120, or may be jiggled, as long as the background image 120 remains in view of the camera. Regardless of such movement, the mobile device 110 may be able to detect and track the foreground object 150 with respect to the background image 120 and the virtual objects 130 and 140 displayed on the screen.

Figure 2:
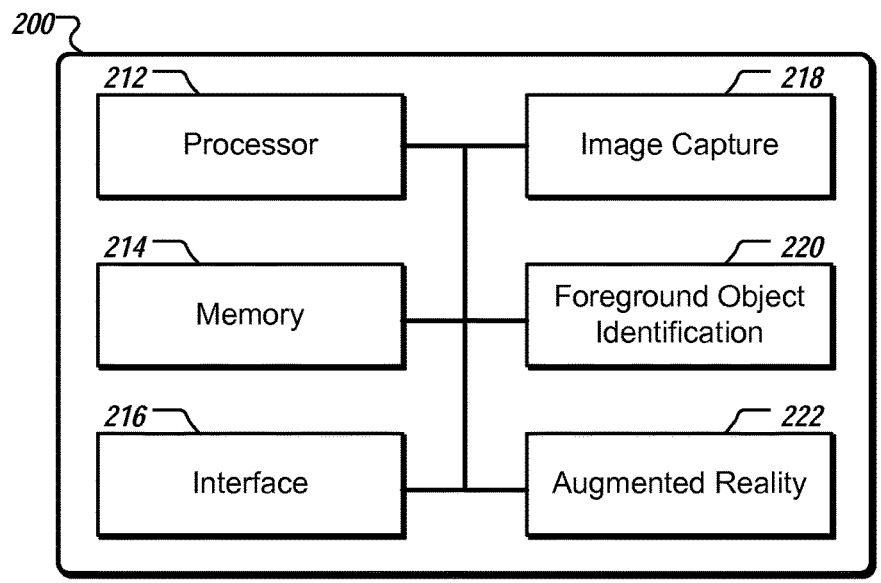
FIG. 2 is a block diagram of an example computing system to occlude an augmented reality object.

FIG. 2 is a block diagram of an example computing system 200 to occlude an augmented reality object. Computing system 200 may, in some implementations, be used to perform portions or all of the functionality described above with respect to the mobile device 110 of FIGS. 1A-1C. However, it should be understood that the computing system 200 may include any appropriate type of computing device, including for example smartphones, tablets, desktops, laptops, workstations, servers, or the like. Computing system 200 may also include groups of appropriate computing devices, and portions or all of the functionality may be performed on a single device or may be distributed amongst different devices. In the case of a computing system 200 that does not have an integrated display, camera, and/or other functional components as described with respect to the integrated display and camera of mobile device 110, an external display, camera, and/or other functional components may be communicatively coupled to the computing system 200 to provide corresponding functionality.

As shown, the example computing system 200 may include a processor resource 212, a memory resource 214, an interface 216, an image capture device 218, a foreground object identification module 220, and an augmented reality module 222. It should be understood that the components shown here are for illustrative purposes, and that in some cases, the functionality being described with respect to a particular component may be performed by one or more different or additional components. Similarly, it should be understood that portions or all of the functionality may be combined into fewer components than are shown.

Processor resource 212 may be configured to process instructions for execution by the computing system 200. The instructions may be stored on a non-transitory tangible computer-readable storage medium, such as in memory resource 214 or on a separate storage device (not shown), or on any other type of volatile or non-volatile memory that stores instructions to cause a programmable processor to perform the techniques described herein. Alternatively or additionally, computing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, the processor resource 212 may include multiple processors and/or types of processors, and the memory resource 214 may include multiple memories and/or types of memory.

Interface 216 may be implemented in hardware and/or software, and may be configured, for example, to receive and respond to inputs provided by a user. The inputs may be provided to interface 216, e.g., via a user interface of the computing system. Example user interfaces of the computing system may include touchscreen devices, pointing devices, keyboards, voice input interfaces, visual input interfaces, or the like. Responses may also be provided by interface 216, e.g., via display on a display device, including touchscreen devices, or via other user interface mechanisms, including audio or haptic feedback, for example.

Image capture device 218 may be configured to capture video images (i.e. a series of sequential video frames) at any desired frame rate, or to take still images, or both. The image capture device 218 may be a still camera, a video camera, or other appropriate type of device that is capable of capturing images. The image capture device 218 may be configured to trigger image capture on a continuous, periodic, or on-demand basis. The image capture device 218 may capture a view of the entire field of view, or a portion of the field of view (e.g. a physical region, black/white versus color, etc.) as appropriate. As used herein, an image is understood to include a snapshot, a frame or series of frames (e.g., one or more video frames), a video stream, or other appropriate type of image or set of images.

Foreground object identification module 220 may execute on processor resource 212, and may be configured to detect a foreground object in images received from the image capture device 218. For example, foreground object identification module 220 may receive an image from the image capture device 218, and may identify a foreground object depicted in the image using markerless identification.

In some implementations, foreground object identification may be based on visual features in the images captured by the image capture device 218. For example, the image capture device 218 may capture an initialization image, which may depict a background that is free of any foreground objects positioned between the background and the device. The initialization image may be stored by computing system 200, e.g., in memory resource 214. The image capture device 218 may also capture subsequent images over a period of time, e.g., after the initialization image is captured. The subsequent images may include the background as well as a foreground object, e.g., a foreground object that the user has placed in front of the image capture device 218.

To detect the foreground object, module 220 may receive the initialization image, e.g., from the image capture device 218 or from memory resource 214, and may receive the subsequent images captured by the image capture device 218 or from memory resource 214. Foreground object identification module 220 may analyze the subsequent images to detect any foreground objects that were not present in the initialization image.

Foreground object identification module 220 may also be configured to identify positioning, shape, and tracking information associated with the detected foreground objects. For example, the module 220 may be used to determine a location of the foreground object, or a specific portion of the foreground object (e.g., a fingertip), in a particular image. In addition, the module 220 may apply a gesture analysis to the detected foreground objects, e.g., to detect and track hand and/or finger-shaped regions, and to determine a particular gesture that is performed by the foreground object.

In some implementations, foreground object identification module 220 may utilize other appropriate markerless techniques to differentiate between foreground objects and background objects. For example, the image capture device 218 may include three-dimensional imaging, and objects determined to be nearest to the device or within a certain distance of the device may be considered foreground objects. Non-visual techniques may also be used to identify foreground objects. For example, thermal imaging may be used to identify foreground objects located proximate to the computing system 200. In the case of thermal imaging, the computing system 200 may include a thermal imaging device, e.g., in conjunction with or integrated with the image capture device 218, and known thermal properties or thermal signatures of an expected foreground object (e.g., a user's hands) may be used to distinguish the foreground object from the background objects. As another example, the foreground object identification module 220 may use sonic feedback signatures to identify foreground objects located proximate to the image capture device 218 (e.g., located within a certain distance of the image capture device 218, or located a certain distance closer to the image capture device 218 than background objects).

Regardless of the markerless approach used to identify the foreground object depicted in the image, the foreground object identification module 220 may then provide information associated with the foreground object (e.g., positioning information, confidence values associated with the identification, and/or other appropriate information) to augmented reality module 222. In some implementations, positioning information may be conveyed using a pixel map describing which pixels correspond to foreground objects and/or which pixels correspond to the background.

In some implementations, corresponding confidence values may also be associated with the pixel map, e.g., on a pixel-by-pixel basis or on an object level, to indicate a level of certainty that certain pixels in an image are associated with a foreground object. The confidence values may be based, in whole or in part, on one or more known attributes associated with expected foreground objects. For example, if the foreground objects are likely to include user's hands, then known attributes associated with hands (e.g., shape, color, positioning, etc.) may be used to determine the likelihood that a particular object is indeed a foreground object. Similarly, other expected foreground objects and their respective attributes may also be defined. In some cases, the known attributes may include color information indicating a likely range of colors associated with an expected foreground object, or may include shape information indicating likely shapes associated with an expected foreground object, or may include position information indicating likely regions where an expected foreground object will be positioned within an image, or other appropriate attributes. Each of these attributes may be used, either alone or in combination with others, to determine confidence values that are assigned when identifying a particular foreground object in the image.

The foreground object confidence values may also be based on previously received images. For example, if a foreground object such as a hand was confidently identified in a previous image, and only a slight movement of the object occurred from the previous image to the current image, then the likelihood that the object is also a foreground object in the current image may be increased. Such foreground identification analysis over multiple images may improve the results of such identification, and may help to decrease the possibility of errors due to motion, lighting changes, or other various error inducing effects.

Augmented reality module 222 may execute on processor resource 212, and may be configured to generate an augmented reality image depicting an augmented reality object at least partially occluded by the foreground object such that, when the augmented reality image is displayed, the augmented reality object appears to be positioned behind the foreground object. In some implementations, augmented reality module 222 may be included as part of a downloadable app that provides the augmented reality functionality described above. For example, the app may operate on appropriate computing systems to display a camera feed augmented with virtual objects that are superimposed in the camera feed. In the augmentation, the virtual objects may be presented as an overlay that appears to be positioned in front of a real-world background, but the virtual objects may be at least partially occluded by foreground objects that are also present in the camera feed.

Partial or full occlusion may be achieved using appropriate techniques. For example, in some implementations, the positioning information from the foreground object identification module 220 may be used to prevent portions of the virtual objects from being rendered as an overlay to portions of the camera feed. In such cases, any portions of the virtual objects that would otherwise overlap with an identified foreground object may be excluded from being drawn. For example, the augmented reality module 222 may draw virtual objects as overlays to the camera feed, except in a portion of the image that is identified as being occupied by a foreground object. In such cases, the foreground object map may be used as a mask to prevent virtual objects from being drawn where the foreground objects have been identified.

In other implementations, the augmented reality scene may be rendered in multiple layers, with the background being the "backmost" layer, the augmentation being the "middle" layer, and the foreground objects being the "frontmost" layer. In such implementations, the layers may be rendered consecutively from back to front such that the foreground objects appear in front of the virtual objects, which appear in front of the background objects.

In some cases, the foreground objects may be rendered using alpha blending techniques such that the foreground objects appear to be semi-transparent. For example, a foreground object such as a user's hand may be drawn semi-transparently so that virtual objects and background objects that are positioned behind the hand may also be seen. In such cases, the transparency value associated with the foreground object may be based on the confidence levels determined during the identification of the foreground objects. For example, if a user's hand has been identified with a high level of confidence as a foreground object, the hand may appear less transparent than if the hand was identified with a lower level of confidence. The foreground object confidence values may also be used in other appropriate manners to affect how the pixels are rendered in the augmented reality scene.

Figure 3:
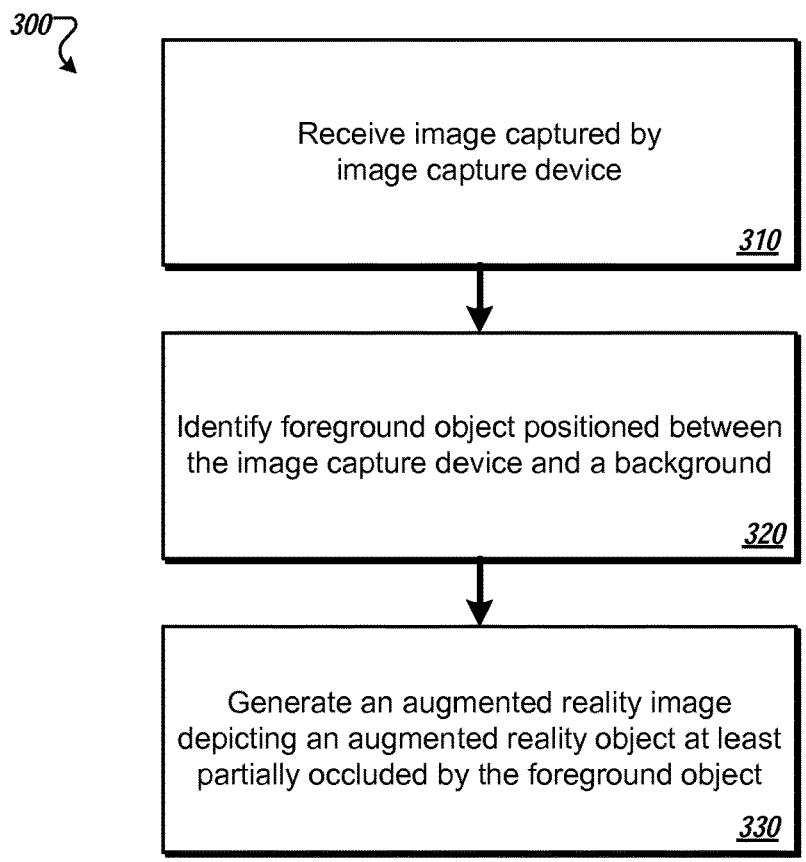
FIG. 3 is a flow diagram of an example process for occluding an augmented reality object.

FIG. 3 is a flow diagram of an example process 300 for occluding an augmented reality object. The process 300 may be performed, for example, by a mobile computing device such as the mobile device 110 illustrated in FIGS. 1A-1C, or by computing system 200 illustrated in FIG. 2. For clarity of presentation, the description that follows uses the computing system 200 as the basis of an example for describing the process. However, it should be understood that another system, or combination of systems, may be used to perform the process or various portions of the process.

Process 300 begins when an image captured by an image capture device is received at block 310. In some implementations, the image may be captured by a two-dimensional image capture device, such as a standard camera integrated with a mobile device, and may be stored in the memory of the mobile device. The image may depict a background and one or more foreground objects. The foreground objects may be positioned between the image capture device and the background, and may be free of any fiducial markers or other distinctive markers as may typically be required for object identification in other augmented reality systems.

At block 320, the one or more foreground objects are identified. Such identification may include comparing the image to an initialization image that depicts the background and does not depict any foreground objects such that newly detected objects in the current image may be identified as foreground objects. In some cases, the current images may be adjusted (e.g., prior to such comparison) to account for movement of the image capture device relative to the background such that the comparison is not affected by the movement. For example, if the initialization image showed the background at a certain angle, and the current view in a subsequent image shows the background at a different angle, the angular differences may be reversed in the subsequent image such that the background of the subsequent image is aligned with the background of the initialization image for comparison purposes. Although a simple rotational adjustment is described in the example above, it should be understood that arbitrarily complex adjustments and/or transformations are also within the scope of this disclosure.

In some cases, identification of the foreground objects may include generation of a pixel map and corresponding pixel confidence values that represent a level of certainty that the pixels are associated with a foreground object. For example, an RGB or YCC representation of an image may include a value associated with each of the pixels (or certain portions of the pixels) in the image. The system may compare corresponding pixels in the initialization image and a subsequent image to determine whether the values are equivalent or close to equivalent (e.g., substantially equivalent, but with some noise or other type of distortion), and may generate a foreground map of the pixels that are determined to be non-equivalent. The foreground map may describe a likelihood, e.g., for each pixel or for certain groups of pixels in the subsequent images, that the pixels are part of the foreground object versus part of the background. Using such a likelihood map may be used to account for any noise or other distortion effects included in the subsequent image.

In some implementations, the likelihood that the pixels are part of the foreground object versus part of the background may be based on known and/or expected information about the foreground object. For example, if the system expects the foreground object to be the bare hand of a user, then the expected information about the foreground object may include a range of skin colors that may be expected in the foreground object. If multiple adjacent pixels fall within the range of skin colors, then those multiple adjacent pixels may be deemed more likely to be part of a user's hand, and such information may be considered when generating or refining the likelihood map. As another example, if the system expects the foreground object to be a particular object of a known color, then the known color may be expected to be found in a valid foreground object, which may increase the likelihood that pixels of that color are part of the foreground. Similarly, shape information may be considered in determining the likelihood that the pixels are part of a foreground object. For example, if a grouping of pixels is generally grouped in the shape of an expected foreground object (e.g., a hand, a stylus, a wand, etc.), then the likelihood that those pixels represent a foreground object is higher. In addition, information about where the foreground object is expected to be positioned may also be used in determining the likelihood of the object being a foreground object. For example, if there are particular regions in the image that are more likely to include a foreground object or more likely to not include a foreground object, then such information may be considered when generating or refining the likelihood map.

Although visual comparisons to a known initialization image are described above, other markerless approaches may also or alternatively be used to identify foreground objects in an image. These approaches, e.g., using three-dimensional imaging, thermal imaging, sonic imaging, or other appropriate techniques, may similarly be used to generate pixel maps and corresponding confidence values that a particular pixel or groups of pixels are associated with a foreground object.

At block 330, an augmented reality image that depicts an augmented reality object at least partially occluded by the identified foreground object is generated. In some implementations, the augmented reality image may be generated by drawing the augmented reality object onto the received image except in a portion of the image that is occupied by an identified foreground object. The augmented reality image may also be generated in layers, with the background being the "backmost" layer, the augmentation being the "middle" layer, and the foreground objects being the "frontmost" layer. In such implementations, the layers may be rendered consecutively from back to front such that the foreground objects appear in front of the virtual objects, which appear in front of the background objects.

In some cases, the foreground objects may be rendered using alpha blending techniques such that the foreground objects appear to be semi-transparent. For example, a foreground object such as a user's hand may be drawn semi-transparently so that virtual objects and background objects that are positioned behind the hand may also be seen. In such cases, the transparency value associated with the foreground object may be based on the confidence levels determined during the identification of the foreground objects. For example, if a user's hand has been identified with a high level of confidence as a foreground object, the hand may appear less transparent than if the hand was identified with a lower level of confidence. The foreground object confidence values may also be used in other appropriate manners to affect how the pixels are rendered in the augmented reality scene.

Figure 4:
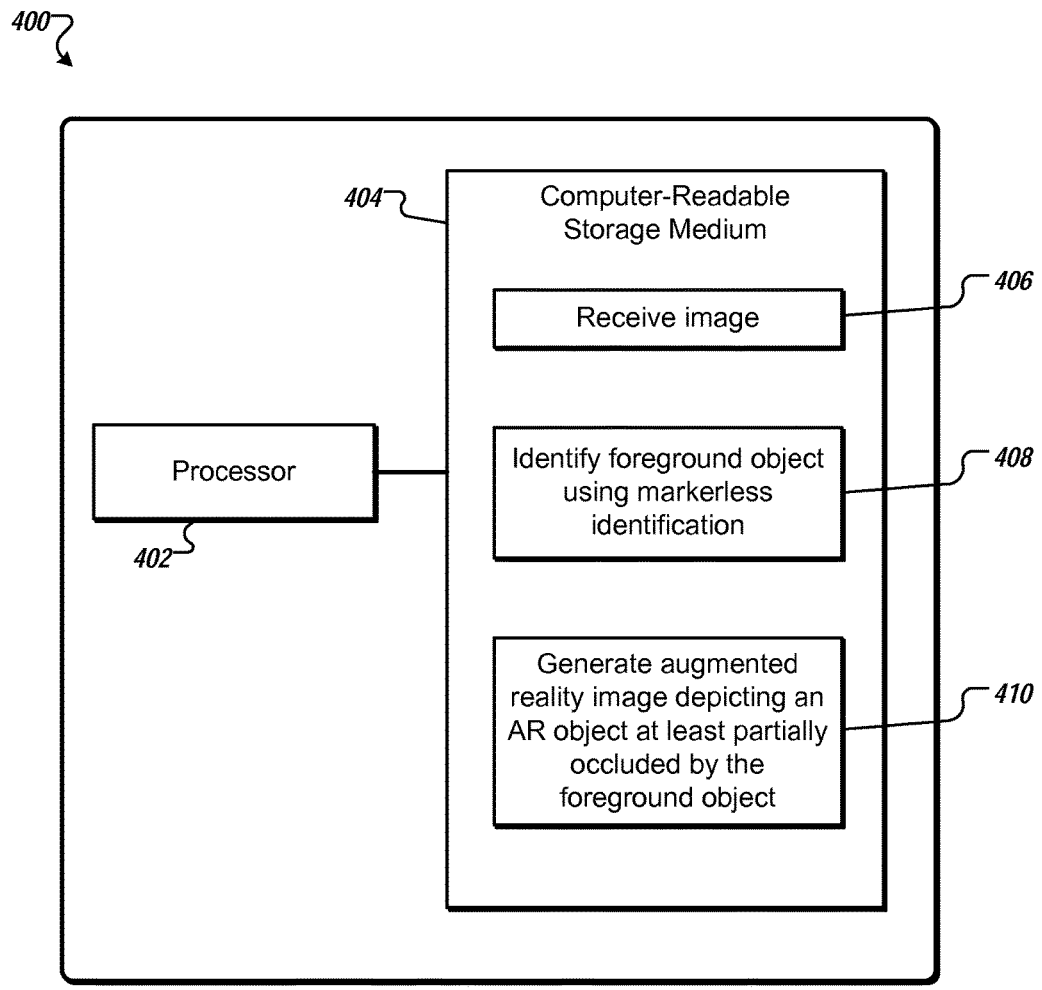
FIG. 4 is a block diagram of an example computing system that includes a computer-readable storage medium with instructions to occlude an augmented reality object.

FIG. 4 is a block diagram of an example computing system 400 that includes a computer-readable storage medium with instructions to occlude an augmented reality object. Computing system 400 includes a processor resource 402 and a machine-readable storage medium 404.

Processor resource 402 may include a central processing unit (CPU), microprocessor (e.g., semiconductor-based microprocessor), and/or other hardware device suitable for retrieval and/or execution of instructions stored in machine-readable storage medium 404. Processor resource 402 may fetch, decode, and/or execute instructions 406, 408, and 410 to occlude an augmented reality object, as described below. As an alternative or in addition to retrieving and/or executing instructions, processor resource 402 may include an electronic circuit comprising a number of electronic components for performing the functionality of instructions 406, 408, and 410.

Machine-readable storage medium 404 may be any suitable electronic, magnetic, optical, or other physical storage device that contains or stores executable instructions. Thus, machine-readable storage medium 404 may include, for example, a random-access memory (RAM), an Electrically Erasable Programmable Read-Only Memory (EEPROM), a storage device, an optical disc, and the like. In some implementations, machine-readable storage medium 404 may include a non-transitory storage medium, where the term "non-transitory" does not encompass transitory propagating signals. As described below, machine-readable storage medium 404 may be encoded with a set of executable instructions 406, 408, and 410.

Instructions 406 may receive an image. Instructions 408 may identify a foreground object depicted in the image using markerless identification. Instructions 410 may generate an augmented reality image depicting an augmented reality object at least partially occluded by the foreground object such that, when the augmented reality image is displayed, the augmented reality object appears to be positioned behind the foreground object.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method comprising:
receiving, at a computing system, an image captured by an image capture device;
identifying, using the computing system, a foreground object depicted in the image, the foreground object being free of fiducial markers and being positioned between the image capture device and a background depicted in the image;
determining a confidence level associated with identification of the foreground object based on sonic feedback signatures; and
generating, using the computing system, an augmented reality image depicting an augmented reality object at least partially occluded by the foreground object such that, when the augmented reality image is displayed, the augmented reality object appears to be positioned behind the foreground object, and wherein the foreground object has a semi-transparent appearance comprising an amount of transparency that is based on the confidence level associated with the identification of the foreground object such that at least one of the occluded part of the augmented reality object and a portion of the background occluded by the foreground object is visible through the foreground object.

2. The method of claim 1, wherein generating the augmented reality image comprises alpha blending the foreground object such that the foreground object appears semi-transparent in the augmented reality image.

3. The method of claim 1, wherein identifying the foreground object comprises comparing the image to an initialization image captured by the image capture device, the initialization image depicting the background and not depicting the foreground object.

4. The method of claim 1, wherein the confidence level is based on a known attribute, independent of the captured image and any previously-received image, of a predetermined expected foreground object physically positionable between the image capture device and a scene corresponding to the captured image.

5. The method of claim 4, wherein the known attribute comprises color information indicating likely ranges of colors associated with the expected foreground object.

6. The method of claim 4, wherein the known attribute comprises shape information indicating likely shapes associated with the expected foreground object.

7. The method of claim 4, wherein the known attribute comprises position information indicating likely regions where the expected foreground object will be positioned in the image.

8. The method of claim 1, wherein the confidence level is based on a previously received image.

9. The method of claim 1, wherein the semi-transparent appearance of the foreground object is inversely proportional to the confidence level associated with the identification of the foreground object.

10. The method of claim 1, wherein the augmented reality image and the foreground object are displayed by the computing system on a display device.

11. A system comprising:
a processor;
a camera, coupled to the processor, to capture images;
a foreground object identification module executable on the processor to
  receive an image from the image capture device,
  identify a foreground object depicted in the image using markerless identification and sonic feedback signatures,
  determine a confidence level associated with identification of the foreground object, and
  assign the confidence level to all pixels of the foreground object; and
an augmented reality engine executable on the processor resource to generate an augmented reality image depicting an augmented reality object at least partially occluded by the foreground object such that, when the augmented reality image is displayed, the augmented reality object appears to be positioned behind the foreground object, wherein the foreground object has a semi-transparent appearance comprising an amount of transparency that is based on the confidence level associated with the identification of the foreground object such that at least one of the occluded part of the augmented reality object and a portion of the background occluded by the foreground object is visible through the foreground object.

12. The system of claim 11, wherein the semi-transparent appearance of the foreground object is inversely proportional to the confidence level associated with the identification of the foreground object.

13. A non-transitory computer-readable storage medium storing instructions that, when executed by a processor resource, cause the processor resource to:
receive an image;
identify a foreground object depicted in the image using markerless identification by generating a map of pixels and corresponding foreground confidence values, the foreground confidence values representing a level of certainty that the pixels are associated with the foreground object, wherein the foreground confidence values are based on a known attribute of a predetermined expected foreground object and sonic feedback signatures, the known attribute independent of the received image; and
generate an augmented reality image depicting an augmented reality object at least partially occluded by the foreground object such that, when the augmented reality image is displayed, the augmented reality object appears to be positioned behind the foreground object and the foreground object has a degree of transparency that is based on the foreground confidence values such that the occluded part of the augmented reality object is visible through the foreground object.

14. A system comprising:
a processor;
a camera, coupled to the processor, to capture at least one of still images or video images;
a foreground object identification module executable on the processor to identify a foreground object depicted in the captured image using markerless identification by generating a map of pixels and corresponding foreground confidence values, wherein the foreground object identification module uses sonic feedback signatures to identify the foreground object, the foreground confidence values representing a level of certainty that the pixels are associated with the foreground object, wherein the foreground confidence values are based on a known attribute of a predetermined expected foreground object, the known attribute independent of the received image; and
an augmented reality engine executable on the processor to generate an augmented reality image depicting an augmented reality object at least partially occluded by the foreground object such that, when the augmented reality image is displayed, the augmented reality object appears to be positioned behind the foreground object and the foreground object has a degree of transparency that is based on the foreground confidence values such that the occluded part of the augmented reality object is visible through the foreground object.

15. The system of claim 14, wherein the predetermined expected foreground object is physically positionable between an image capture device and a scene corresponding to the received image.

* * * * *